United States Patent [19]

Zublin

[11] E Re. 31,495

[45] Reissued Jan. 17, 1984

[54] HYDRAULIC JET WELL CLEANING METHOD AND APPARATUS

[76] Inventor: Casper W. Zublin, 801 Hewlett, Bakersfield, Calif. 93309

[21] Appl. No.: 479,036

[22] Filed: Mar. 25, 1983

Related U.S. Patent Documents

Reissue of:

[64] Patent No.: 4,349,073
Issued: Sep. 14, 1982
Appl. No.: 195,303
Filed: Oct. 7, 1980

[51] Int. Cl.[3] ..... E21B 37/00; E21B 37/06

[52] U.S. Cl. ..... 166/312; 134/167 C; 166/73; 166/178; 166/223; 239/397; 239/550; 239/600

[58] Field of Search ..... 166/178, 222, 223, 379, 166/312, 311, 378, 67, 72, 73; 175/422; 299/16, 17; 239/550, 600, 266, 390; 134/167 C, 168 C, 172, 198

[56] References Cited

U.S. PATENT DOCUMENTS

| | | | |
|---|---|---|---|
| 2,302,567 | 11/1942 | O'Neill | 166/223 X |
| 2,998,068 | 8/1961 | True | 166/55 |
| 3,007,523 | 11/1961 | Vincent | 166/312 X |
| 3,266,571 | 8/1966 | St. John et al. | 166/223 X |
| 3,310,113 | 3/1967 | Maness | 166/222 X |
| 3,720,264 | 3/1973 | Hutchison | 166/311 |
| 3,771,730 | 11/1973 | Nicoloff et al. | 239/550 X |
| 3,811,499 | 5/1974 | Hutchison | 166/67 |
| 3,829,134 | 8/1974 | Hutchison | 285/14 |
| 3,850,241 | 11/1974 | Hutchison | 166/222 |
| 4,088,191 | 5/1978 | Hutchison | 166/223 |
| 4,193,635 | 3/1980 | Thiruvengadam et al. | 299/17 |

OTHER PUBLICATIONS

Down Hole Services, Inc., Brochure, "Hydraulic Perforation Cleaning (HPC) Service", 6-79, pp. 1-3, 5-79, 9 and 9.1.

*Primary Examiner*—Stephen J. Novosad
*Attorney, Agent, or Firm*—Knobbe, Martens, Olson & Bear

[57] ABSTRACT

A jet carrier assembly for cleaning well liners has a jet tool stabilized by a centralizer proximate to each of the tool's upper and lower ends. The jet tool is an elongate member having about 4 to 8 pairs of jet nozzles axially spaced therebetween, the axial spacing between alternate pairs being equal. The jet nozzles are spaced to provide a jet fluid track that covers any given point on the liner at least once but not more than twice when the member is lifted at a constant selected vertical speed and a constant selected rotational speed. The nozzles are mounted within adapters which are in turn detachably mounted to the elongate member. The adapters, which are provided in various sizes depending upon the diameter of the well liner, are interchangeable. The centralizers are capable of axial and rotational movement along mandrels attached to the upper and lower ends of the tool. The centralizers which are provided in varying sizes, depending upon well liner diameter, have a central bore which slidably engages the mandrel permitting the rotation of the centralizer to be isolated from the rotation of the jet tool. For any given diameter well liner, the adapters and centralizers are chosen to provide a jet nozzle to liner standoff distance of about 5 to 10 times the diameter of the nozzle orifice.

3 Claims, 5 Drawing Figures

Fig. 1
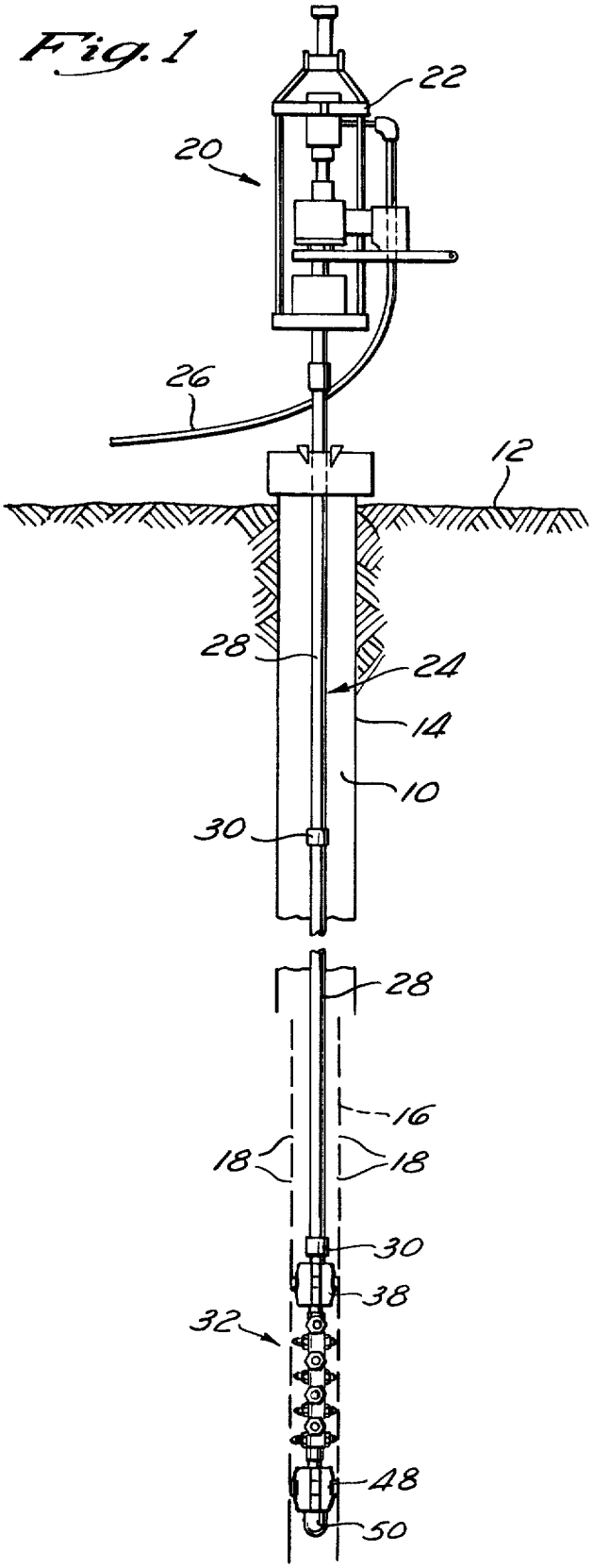
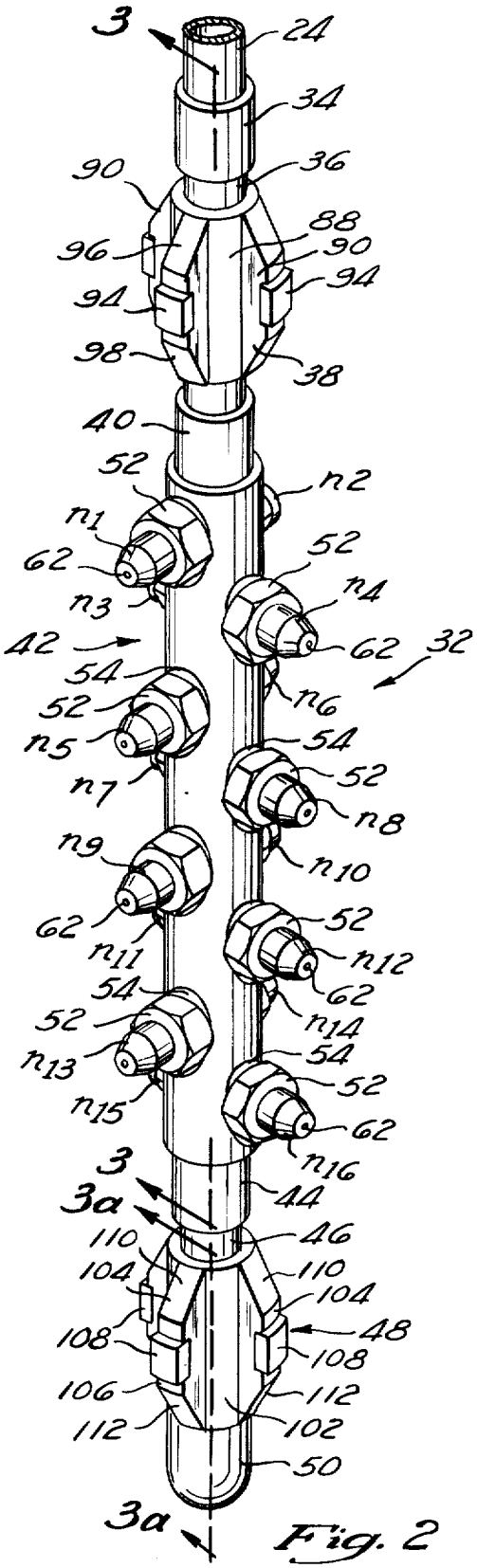
Fig. 2

Fig. 3
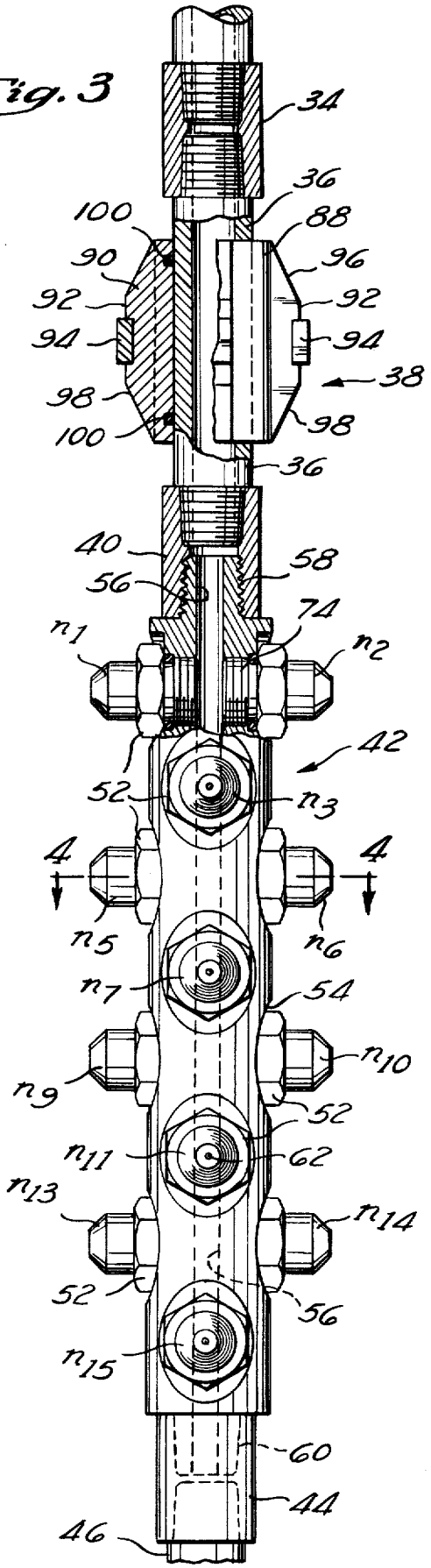
Fig. 4
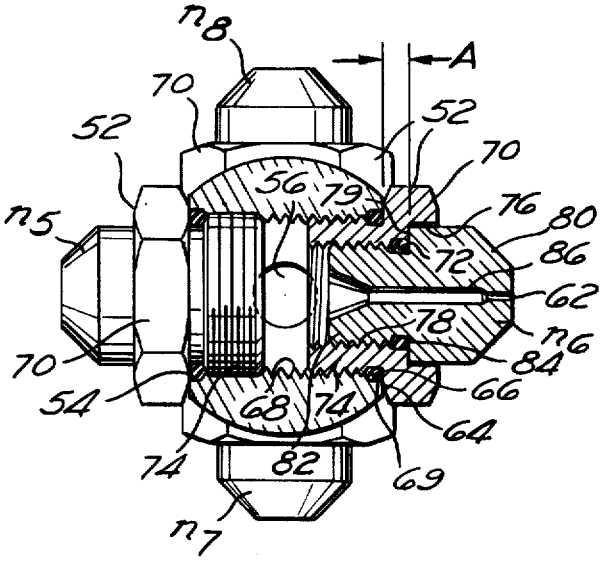
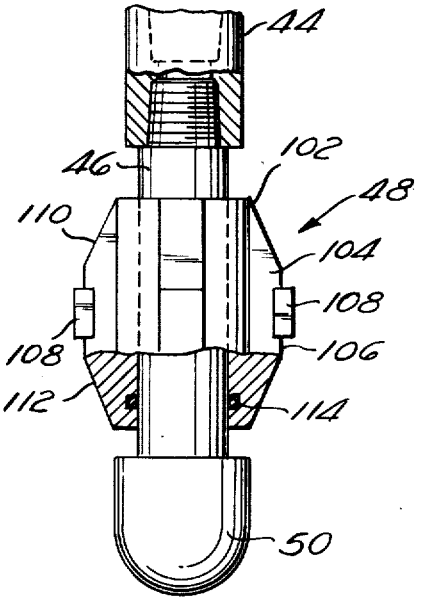
Fig. 3a

HYDRAULIC JET WELL CLEANING METHOD AND APPARATUS

Matter enclosed in heavy brackets [ ] appears in the original patent but forms no part of this reissue specification; matter printed in italics indicates the additions made by reissue.

BACKGROUND OF THE INVENTION

The invention is directed to devices using high velocity liquid jets for cleaning perforated, slotted and wire-wrapped well liners which become plugged with foreign material.

In the well producing art, it is customary to complete wells, such as water, oil, gas, injection, geothermal, source, and the like, by inserting a metallic well liner adjacent a fluid producing formation. Openings in the well linear provide passage-ways for flow of fluids, such as oil or water and other formation fluids and material from the formation into the well for removal to the surface. However, the openings, which, for example, may be slots preformed on the surface or perforations opened in the well, will often become plugged with foreign material, such as products of corrosion, sediment deposits and other inorganic complexes. Analysis of the plugging material has shown it to be fine sand grains cemented together with oxides, sulfides and carbonates. Some asphaltenes and waxes are also present. Where water is produced, scale also seems to be a very tough plugging material. Removal and replacement of the liner is costly and is only a temporary solution as the liner will eventually again become plugged.

Jetted streams of liquid have been heretofore used to clean openings. The use of jets was first introduced in 1938 to directionally deliver acid to dissolve carbonate deposits. Relatively low velocities were used to deliver the jets. However, this delivery method did improve the results of acidizing. In about 1958 the development of tungsten carbide jets permitted including abrasive material in a liquid which improved the ability of a fluid jet to do useful work. The major use of abrasive jetting has been to cut notches in formations and to cut and perforate casing to assist in the initiation of hydraulically fracturing a formation. The abrasive jetting method requires a large diameter jet orifice. This large opening required an unreasonably large hydraulic power source in order to do effective work. The use of abrasives in the jet stream permitted effective work to be done with available hydraulic pumping equipment normally used for cementing oil wells. However, the inclusion of abrasive material in a jet stream was found to be an ineffective perforation cleaning method in that it enlarged the perforation which destroyed the perforation's sand screening capability.

More recently, Chevron Research Company disclosed a method and apparatus for directionally applying high pressure jets of fluid to well liners in a number of U.S. patents. These patents are U.S. Pat. Nos. 3,720,264, 3,811,499, 3,829,134, 3,850,241, and 4,088,191, which are herein incorporated by reference.

The assignee of the subject application is a licensee of the Chevron Systems and developed a cleaning operation and device pursuant to the Chevron disclosures. This system, which will hereinafter be referred to as the old design, employed a jet carrier of about 6 feet in length having 8 jet nozzles widely spaced along its length. The nozzles were threadably mounted on extensions which were in turn welded to the jet carrier. A fixed tri-blade pilot bit was fixed to the lower end of the jet carrier.

The jet carrier was attached to a tubing string that could be reciprocated and rotated within the well bore. As the carrier was moved and rotated adjacent the liner, the nozzles directed jet streams which contacted and cleaned the liner.

The distance between the well liner and the end of the jet nozzle, called the standoff distance, is critical in such a process. If this distance becomes too great, the power of the jet stream against the liner drops off markedly (decreasing proportional to the square of the distance). Conversely, if the standoff distance becomes too small, the power of the jet stream is reduced to a laminar flow along the well liner. Such a flow is also inadequate for proper cleaning. Thus, it has been found that the standoff distance should be between about 5 and 10 times the diameter of the jet nozzle orifice.

In the old design, the only means to regulate the standoff distance was to vary the diameter of the jet carrier itself. Thus, four different sizes of jet carriers were available for differently sized well liners. The Chevron patents disclose that liner adjustments can be made by turning the jet nozzles in and out of the welded extensions. However, in practice, this was found not to be workable because of leakage if the nozzles are not tight in the extensions.

A function of the pilot bit was to provide mechanical centralization of the jet tool during running of the tool in the well. Thus, the blades of the pilot bit were selected to be slightly less in diameter than the inside diameter of the liner.

This old design, although a significant advance in the art, developed a number of problems. First, the spiral track created by the streams of fluid from the nozzles as the tool was lifted and rotated, were widely spaced from each other. In order to ensure coverage of each point on the liner, the vertical and rotational speed had to be decreased to levels which resulted in fluid coverage of other points on the liner of three or more times. Conversely, if the rotational and vertical speeds were increased to reduce the coverage of areas to no more than twice, significant areas on the liner remained uncleaned. This caused substantial inefficiencies in the cleaning process.

Secondly, the wide spacing of the nozzles required a long jet carrier which was prone to jamming in well bores which deviated significantly from vertical.

Thirdly, since the extensions were permanently welded to the carrier, a different size jet carrier was required for each size of well liner. To retain such an inventory of carriers was expensive and produced logistic complications in the transportation of the various sized carriers to on-site cleaning operations. Accordingly, only four sizes of jet carriers were available for the various sizes of well liners. As a result, control over the standoff distance was inexact and limited, and the required standoff distances of about 5 to 10 times the diameter of the nozzle orifice were often being violated. In a few cases, the distance was exceeded by 10 to 15 diameters.

A fourth problem was the possibility of weld failure at the extension/carrier interface.

A fifth problem was the inability of the fixed pilot bit to ensure concentric rotation of the assembly. At times in "tight hole" situations, the assembly was prone to jam or produce back-torque due to liner contact. If the fixed pilot bit were made smaller to reduce jamming, the standoff distance could vary resulting in nozzle peening or closing of the jet orifices.

Due to the multitude of problems which developed with the old design, a strong need existed for a device and method of cleaning well liners in which every perforation on any given liner could be cleaned more effectively and efficiently in a more practical, economical operation.

SUMMARY OF THE INVENTION

The disclosed invention which obviates the disadvantages of the prior methods and devices discussed above, provides a jet carrier assembly having a jet tool stabilized by a centralizer proximate to each of the tool's upper and lower ends. The jet tool which is less than 2 feet long has between 8 and 16 nozzle jets spaced along its length. The number and spacing of the nozzles is such that the tool can be lifted at a constant vertical speed and rotated at a constant rotational speed which will provide jet tracks of fluid streams which cover any given point on the well liner at least once but not more than twice.

In the preferred embodiment, 16 nozzles are spaced along the jet tool. The nozzles form 8 axially spaced pairs. The nozzles in a given pair are circumferentially spaced 180° from each other. Adjacent pairs of nozzles are circumferentially offset 90° from each other. Thus, the four nozzles in two adjacent pairs are directed toward the liner at 90° intervals.

The particular nozzle number, nozzle spacing, vertical and rotational speeds employed in the preferred embodiment were chosen on the basis of calculations preformed with a mathematical formula. This formula is used to provide the jet stream track pattern for a given jet tool. The spacing between the tracks is then calculated from this track pattern. Comparing this spacing with the known width of the jet streams determines whether the jet tool will expel streams which cover the liner at least once but not more than twice. Similar calculations using this formula may be done to choose different nozzle numbers, spacing and vertical and rotational speeds.

The invention design and method allows the use of greater vertical and rotational speeds without producing gaps in the cleaning coverage. For example, in the preferred embodiment, vertical speed can be increased to 3 feet per minute contrasted with 1 to 1½ per minute used in the old system. Despite this greater speed, all points on the liner are covered with jets streams at least once ensuring the effectiveness of the operation. Moreover, no point is covered more than twice ensuring the efficiency and economy of the operation. In addition, the design allows the nozzles to deliver the fluid uniformly against the liner with an average of 2 to 4 times the energy of the old system.

Another advantage of the inventive design is that the spacing of the nozzles is much closer resulting in a much shorter jet tool. This reduces the possibility of the tool becoming jammed when the well bore curves.

In the inventive design, the jet nozzles are mounted in adapters which in turn are removably mounted to the jet tool. The adapters are provided in many different sizes and can be easily mounted or removed from the jet tool. As a result, for a given liner diameter, an appropriately sized adapter can be selected which is calculated to give the required standoff distance of about 5 to 10 times the diameter of the jet orifice. The interchangeability of the various sizes of adapters eliminates the necessity for jet tools of different diameters. Using this design, applicant has been able to use a single jet tool size for liners having a diameter from 5½ inches to 9⅝ inches or more.

Moreover, the adapters allow a machine design which requires no welding. Thus, the weld failure problem of the extensions of the old device is eliminated.

The design also uses a centralizer at each end of the jet tool. The centralizers have a central bore which slidably engages mandrels attached to the upper and lower ends of the tool. This slidable engagement permits the centralizers to move both axially and rotationally with respect to the jet tool. The rotational movement of the centralizers tends to reduce and, in many cases, eliminates any back-torque which otherwise can develop because of contact between the centralizer and the liner. Moreover, if the centralizers should become jammed, the axial freedom of the centralizer with respect to the tubing permits the tubing to be moved up and down creating a jarring action to free the assembly.

The use of dual centralizers ensures concentric rotation of the assembly even when tubing is not straight. Moreover, the centralizers are provided in various sizes depending upon the size of the liners. Thus, an appropriately sized centralizer is chosen for each liner calculated to produce the required standoff distance. As a result, the centralizers prevent the jet nozzles from contacting the metal liner, thereby eliminating closing by peening of the jet orifice.

Thus, the centralizers and adapters are readily changeable for a given liner size. The tubing, jet tool and mandrels are of a single size. The system is therefore more versatile and more economical since inventories of differently sized jet tools can be eliminated.

A further advantage of the design is that certain nozzles can be eliminated as the depth of the well or the amount of liner to be cleaned increases. This is important because as the depth of the well increases, there is more opportunity for fluid leaks to occur at tubing joints. Secondly, as the amount of liner to be cleaned increases, the size of the jet orifice enlarges due to wear. Both of these factors results in a pressure drop at the jet. With the new design, nozzles can be eliminated to counteract the pressure drop and yet still ensure that each point of the liner is cleaned at least once.

These and other advantages will be clarified and discussed in the following section with reference to the following drawings in which:

FIG. 1 is an elevation view partially in section illustrating the inventive jet carrier assembly within a well bore and attached to the high pressure rotating swivel;

FIG. 2 is a perspective view of the inventive jet carrier assembly;

FIG. 3 is an elevation view partially in section of the portion of the jet carrier assembly above the lower centralizer;

FIG. 3a is an elevation view partially in section of the lower end portion of the jet carrier assembly; and FIG. 4 is an elevation view partially in section taken through line 4—4 of FIG. 3.

DETAILED DESCRIPTION OF THE PREFERRED EMBODIMENT

Referring to FIG. 1, a well 10 is shown drilled into the earth's surface 12. The upper portion of the well 10 is cased with a suitable string of casing 14. A liner 16 having suitable openings 18 is hung from the casing and extends along the producing formation (not shown). The openings 18 which may be slots or perforations permit flow of formation fluids from the formation into the interior of the well 10. As the formation fluids are produced, the openings 18 in the slotted liner 16 tend to become plugged by depositions of scale, asphalt, clay and sand. The plugging material in the various slots, at different elevations in the liner, will vary in composition and depending upon the composition, will be more or less difficult to remove. As the slots become plugged production from the well declines. Once it has been determined that the openings 18 in the well liner 16 have become plugged to the extent that cleaning is required for best operation of the well, a hydraulic jet cleaning apparatus 20 is assembled to accomplish such cleaning.

The apparatus 20 is composed of a high pressure rotating swivel 22 which is in turn rotatably connected to a tubing string 24. A high pressure hose 26 provides the tubing string 24 with a sorce of high pressure liquid. The tubing string 24 extends downward into the well 10 by means of a series of tubing sections 28 connected by collars 30. All features thus identified of the hydraulic jet cleaning apparatus 20 form no part of the present invention. The tubing string 24 extends into a jet carrier assembly 32, adjacent the slotted liner 16 which assembly and method of use thereof form the subject invention.

The high pressure hose 26 supplies high pressure fluid, such as water which may be mixed with chemical additives, to the tubing string 24. The fluid travels down the tubing string 24 to the jet carrier assembly 32 from which it is jetted. The high pressure swivel 22 is utilized to permit rotation of the tubing string 24 during jetting operation. The tubing string 24 is also reciprocated in the well 10 during such cleaning operation. To clean the opening 18 in the liner 16, the jet carrier assembly 32 is positioned adjacent the openings 18 and lifted upward while being simultaneously rotated. A cleaning operation may entail a second pass in which the jet carrier assembly 32 is moved downward while being simultaneously rotated past the openings 18 and the liner 16. More than two passes can be made if desired.

Referring to FIG. 2, the jet carrier assembly 32 is shown in an enlarged perspective view. A portion of the tubing string 24 is connected to a collar 34 which is in turn connected to an upper mandrel 36. An upper centralizer 38 slidably engages the upper mandrel 36. The upper mandrel 36 is connected to a collar 40 which is in turn connected to a jet tool 42. The jet tool 42 is connected to a collar 44 which is in turn connected to a lower mandrel 46. A lower centralizer 48 slidably engages the lower mandrel 46. The lower mandrel 46 is connected to a bull plug 50. The jet tool 42 has nozzles $n_1$ through $n_{16}$ spaced along its length. Each of the nozzles $n_1$ through $n_{16}$ has a jet orifice 62. Each of the nozzles $n_1$ through $n_{16}$ is threaded into a hexagonally shaped adapter labeled generally as 52. The adapters 52 are in turn threadably mounted within adapter seats labeled generally as 54.

Referring now to FIGS. 2 and 3, the jet tool 42 is formed of a tubular elongate member which, in the preferred embodiment, is approximately 20⅜ inches in length. The diameter of the jet tool in the preferred embodiment is 2.75 inches. This diameter has been used for all well liner sizes of 5½ inches to 9⅝ inches in diameter. Running through the middle of the jet tool is a fluid channel 56. Located at upper and lower ends of the jet tool 42 are threaded ends 58,60 respctively which are of smaller diameter than the body of the jet tool 42.

The nozzles $n_1$ through $n_{16}$ form 8 pairs. Thus, nozzles, $n_1$ and $n_2$ form a first piar, nozzles $n_3$, $n_4$, form a second pair, nozzles $n_5$ and $n_6$ form a third pair, nozzles $n_7$, $n_8$ form a fourth pair, nozzles $n_9$, $n_{10}$, form a fifth pair, nozzles, $n_{11}$, $n_{12}$, form a sixth pair, nozzles $n_{13}$, $n_{14}$, form a seventh pair, and $n_{15}$, $n_{16}$ form an eighth pair. The nozzles in each pair are circumferentially spaced 180° from each other. For example, nozzle $n_2$ is circumferentially spaced 180° form nozzle $n_1$. Adjacent pairs of nozzles are circumferentially offset 90° with respect to each other. Thus, the nozzle pair $n_3$, $n_4$, is 90° out of phase with respect to the nozzle pair formed by $n_1$, $n_2$. The four nozzles in any adjacent two pair of nozzles are directed toward the well liner at intervals of 90°. Thus, the nozzles $n_1$, $n_2$, $n_3$, and $n_4$, as a group, are spaced at 90° intervals.

Each pair of nozzles is axially spaced from each other. In the preferred embodiment, the nozzle pair $n_3$, $n_4$, is axially spaced 2⅛ inches from the nozzle pair $n_1$, $n_2$. The nozzle pair $n_3$, $n_4$, is axially spaced 2 inches from the nozzle pair $n_5$, $n_6$. The nozzle pair $n_5$, $n_6$, is axially spaced 2⅛ inches from the nozzle pair $n_7$, $n_8$. The nozzle pair $n_7$, $n_8$, is axially spaced 2 inches from the nozzle pair $n_9$, $n_{10}$. The nozzle pair $n_9$, $n_{10}$ is axially spaced 2⅛ inches from the nozzle pair $n_{11}$, $n_{12}$. The nozzle pair $n_{11}$, $n_{12}$, is axially spaced 2 inches from the nozzle pair $n_{13}$, $n_{14}$. The nozzle pair $n_{13}$, $n_{14}$, is axially spaced 2⅛ inches from the nozzle pair $n_{15}$, $n_{16}$. Thus, each alternate axially spacing is equal with one set of alternate axial spacings equaling 2 inches and the other set of alternate axial spacings equaling 2⅛ inches. Although theoretically equal spacing between each pair would be satisfactory, it has been found preferable in actual practice, because of unavoidable variations in rotational and lift speed that a slight variance as specified in each alternate axial spacing is preferable.

During a cleaning operation, the jet tool 42 is simultaneously rotated and lifted. The rotation and vertical movement of the jet tool 42 causes the jet streams from the nozzles $n_1$ through $n_{16}$ to traverse helical paths during the cleaning operation. Further, it was determined that the jet orifices 62 which, in the preferred embodiment are 0.03 inches in diameter, produced a jet stream which is approximately ¼ inch in diameter at the appropriate standoff distance. The vertical and rotational speeds were then chosen in relation to the number and spacing of the nozzles to provide jet tracks of fluid streams whose center to center spacing was in the range of equal to or one-half the width of said fluid stream, i.e., ¼ inch, producing a stream coverage of any given point on said liner of at least once but not more than twice.

In order to understand how to space a given number of nozzles properly in relation to a vertical and rotational speed to produce stream coverage of at least once but not more than twice, it is necessary to examine the mathematical formula which was used to generate the preferred embodiment. First, let us assume that the total number of nozzles equals 16, and that these nozzles are spaced in the relation as already described in FIGS. 2 and 3. The vertical and rotational speeds must then be calculated which will provide a stream coverage of any given point of the linear of at least once but more than twice. Given a jet stream width of ¼ inch, if each jet track from each nozzle is spaced ⅛ of an inch, then any given point on the liner will be covered at least twice. If the jet tracks are each spaced ¼ inch from each other, any given point on the liner will be covered at least once.

Assume that nozzle $n_1$ is a base point, and that the jet tool will be rotated and lifted so that the jet streams from the nozzles traverse helical paths. The following equation will provide the distance in inches of a nozzle track above the base point for a certain number of revolutions. This formula is as follows:

$$t_x=(V/R)(f)(c_i)-(a_i)+(V/R)(f)(z) \quad (1)$$

wherein:

$t_x$ = the distance in inches of nozzle $n_x$ above the base point ($n_1$ before vertical or rotational movement) after a certain number of rotations;

V equals the vertical speed in feet per minutes;

R equals the rotational speed in rotations per minute;

f equals a conversion factor for converting feet to inches;

$c_i$ equals the fraction of a rotation nozzle $n_i$ is circumferentially spaced from nozzle $n_1$;

$a_i$ equals the axial spacing of nozzle $n_i$ from nozzle $n_1$;

Z equals the lowest positive integer which will make $t_x$ positive.

The entire set of formulae for 16 nozzles which are spaced as has been described with a rotational speed of 24 rotations per minute and a vertical speed of 4 feet per minute is as follows:

$t_1$ = base point = 0

$t_1=(4/24)(12)=2$ $t_2=(4/24)(12)(0.5)=1$ $t_3=(4/24)(12)(0.25)-2+(4/24)(12)(1)=0.5$ $t_4=(4/24)(12)(0.75)-2+(4/24)(12)(1)=1.5$ $t_5=(4/24)(12)-4.125+(4/24)(12)(2)=1.875$ $t_6=(4/24)(12)(0.5)-4.125+(4/24)(12)(2)=0.875$ $t_7=(4/24)(12)(0.25)-6.125+(4/24)(12)(3)=0.375$ $t_8=)4/24)(12)(0.75)-6.125+(4/24)(12)(3)=1.375$ $t_9=(4/24)(12)-8.25+(4/24)(12)(4)=1.75$ $t_{10}=(4/24)(12)\ (0.5)-8.25+(4/24)\ (12)\ (4)=0.75$ $t_{11}=(4/24)\ (12)\ (0.25)-10.25+(4/24)(12)(5)=0.25$ $t_{12}=(4/24)(12)(0.75)-10.25+(4/24)(12)(5)=1.25$ $t_{13}=(4/24)(12)-12.375+(4/24)(12)(6)=1.625$ $t_{14}=(4/24)(12)(5)-12.375+(4/24)(12)(6)=0.625$ $t_{15}=(4/24)(12)(0.25)-14.375+(4/24)(12)(7)=0.1-25$ $t_{16}=(4/24)(12)(0.75)-14.375+(4/24)(12)(7)=1.1-25$

Taking some specific examples will clarify the use of formula (1). For example, $t_1$ provides that nozzle $n_1$ after rotation will be at a locus 2 inches directly above its original point, the base point. Since nozzle $n_2$ is circumferentially spaced one-half a rotation from nozzle $n_1$, it will be directly above the base point in one-half a rotation. Thus, for $t_2$, V/R is multiplied by 0.5 which gives a value of 1 inch. This means that the vertical distance which nozzle $n_2$ travels at the first time it is directly above the base point is 1 inch. Taking one more example, nozzle $n_3$ is circumferentially spaced from nozzle $n_1$, i.e., $c_3$, one-quarter of a rotation. However, after one-quarter of a rotation, nozzle $n_3$ will be directly below the base point because $n_3$ is axially spaced from nozzle $n_1$, i.e., $a_3$, a distance of 2 inches. Thus, after one-quarter of a rotation $n_3$ will be 1.5 inches below the base point. The factor V/R(12)(Z) is therefore added to this value until $t_3$ becomes positive. When this occurs, nozzle $n_3$ will have traveled enough rotations to be above the base point. In order to make $t_3$ positive, the factor Z must equal one. The value of $t_3$ is thus calculated to be 0.5. This means that after one and a quarter rotations, nozzle $n_3$ will, for the first time, be directly above the base point. These calculations are then made for each nozzle.

The following is a listing of the calculated values of $t_x$ from largest in magnitude to smallest in magnitude. This listing represents a plot of the nozzles and therefore the jet tracks frozen in time when they are directly above the base point. Although the locus of points described by the jet tracks during the cleaning operation are helixes, these helixes are mutually parallel for each nozzle. Thus, the following plot of jet track positions would be true at any given point along the liner. Calculating the differential between each adjacent value of $t_x$ determines the spacing of the jet tracks. Continuing with the example when R=24 and V=4, the track pattern and spacing is as follows:

| Plotted Track Pattern | |
|---|---|
| $t_x$ | Track Spacing In Inches |
| $t_1$ = 2 | .125 |
| $t_5$ = 1.875 | .125 |
| $t_9$ = 1.75 | .125 |
| $t_{13}$ = 1.625 | .125 |
| $t_4$ = 1.5 | .125 |
| $t_8$ = 1.375 | .125 |
| $t_{12}$ = 1.25 | .125 |
| $t_{16}$ = 1.125 | .125 |
| $t_2$ = 1 | .125 |
| $t_6$ = .875 | .125 |
| $t_{10}$ = .75 | .125 |
| $t_{14}$ = .625 | .125 |
| $t_3$ = .5 | .125 |
| $t_7$ = .375 | .125 |
| $t_{15}$ = .125 | .125 |
| $t_1$ = 0 | .125 |

The track spacing between adjacent nozzles is a constant ⅛ inch. Since the thickness of the jet stream expelled from the nozzles has been determined to be ¼ inch, this combination of nozzle number, nozzle spacing and vertical and rotational speeds will provide a tool which covers each point on the liner twice.

Throughout the specification it has been stated that the nozzle number and nozzle spacing provide a tool which covers each point on the liner at least once and no more than twice when the tool is lifted at a selected constant vertical and rotational speed. While this is theoretically true, it should be understood that in a particular operation, field limitations on the ability to control rotating and lift of the carrier assembly may result in stream coverage of some areas of the liner somewhat more than twice. It should also be understood that different combinations of rotational and vertical speeds are possible for any given number of nozzles and nozzle spacing. In the example given when R=24 and V=4, theoretical double jet track coverage is obtained.

In field use, a reasonable range of values of these variables has been determined to maintain the system within operational and cost effective limitations. Thus, for a jet tool having 16 nozzles which are spaced as shown in FIG. 2, a preferred vertical speed range is about 2.5–4 feet per minute. The preferred rotational speed range is about 20–30 rotations per minute. Acceptable ranges for vertical speed occur between about 1–10 feet per minute, and acceptable ranges for rotational speed occur between about 10–50 rotations per minute. Moreover, the selection of the particular combinations of values of V and R will be somewhat dependent upon liner size. The values given apply to liners of about 2¾ to 12 inches in diameter. As the liner size increases, the tangential speed of the jet streams at the target on the liner will become greater. It is expected that for liner sizes above about 12 inches in diameter, values of R=24 and V=4 result in a tangential speed of the jet streams at the target so great that an insufficient dwell time (the time a nozzle is directed toward a given area) exists for proper cleaning. Thus, a combination of V and R should be selected which is smaller in value, for example, V=3 and R=18.

It will now be understood by those in the art that formula 1 may be used to determine the jet track coverage for any given set of parameters. Although theoretically, any number of nozzles could be employed, it has been found that other factors cause the acceptable range of nozzles to be between about 8–16 nozzles. Thus, if the number of nozzles rises much above 16, the pressure at each nozzle drops off undesirably, and too much water tends to be delivered to the well causing the danger of water blocks which inhibit the production of the well. Conversely, if the number of nozzles decreases too much below 8, the time required for the cleaning operation becomes cost ineffective.

The inventive design allows the use of vertical speeds which are greater than those which could be obtained in the past. Thus, the devices operated according to the Chevron disclosures, obtained a vertical speed of about 1–1½ feet per minute. As described, the optimum vertical speed for the present design is about 3 feet per minute.

Another important advantage of the inventive design is that several times the energy can be applied to a given point on the inside of the liner to be cleaned than was previously possible. The energy of the stream delivered to the liner is proportional to the number of times any given point on the liner is hit by the stream. With the old device, many gaps occurred between the jet tracks and many areas on the liner were not hit at all. In these areas, the energy delivered was, of course, zero. Other areas on the liner, were hit three or more times by the stream. In these areas, the energy delivered to the liner was greater than that delivered by the present system in which no point is hit more than twice. However, if the energy delivered to the liner by the old device is averaged, this value is far less than the energy delivered to each point by the new design. For example, calculations indicate that energy delivered with the current design to a slot that is 2 inches long by approximately 0.004 inches wide is from 200–400 pound feet. This compares with about 100 pound feet of energy on the same area for the old design.

Another important advantage of the current design is that certain jets can be eliminated from the configuration while still retaining a jet tool which hits every point on the liner at least once. The number of jets should be decreased when either the depth of the well increases or the amount of liner to be cleaned increases. This is due to volumetric limitations of the pump at a given pressure. As more tubing is put in the hole, the opportunity for leaks at the tubing joints increases. Thus, as the depth of the well increases, the opportunity for leaks increases. Secondly, the orifice of the jet nozzles themselves tends to enlarge somewhat with use. Thus, as the amount of liner to be cleaned increases in size, the jet nozzles tend to enlarge. This causes a pressure drop across the jet. As the number of nozzles is decreased, the vertical speed should also be decreased somewhat to ensure complete coverage of the liner.

An empirical jet selection chart has been devised which provides the number of jets and the vertical speed which would be used for any given depth and any given amount of liner to be cleaned.

JET SELECTION CHART AND VERTICAL SPEED OPERATING DATA

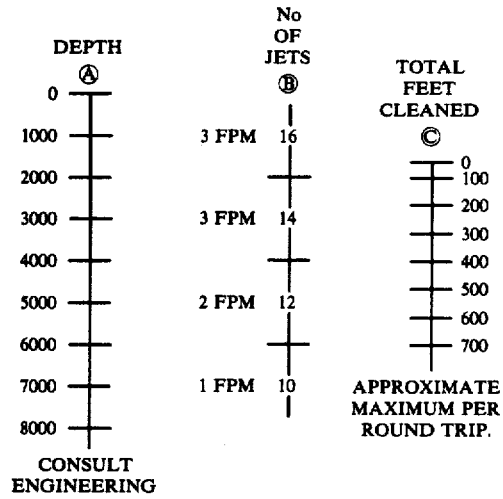

Empirically, it has been determined that drawing a straight line between the well depth, in Column A, and the feet cleaned in Column C, provides an indication of the number of nozzles to use and the vertical speed at the intersection of this line with Column B.

Once it has been determined that, for example, only 14 nozzles should be used, the plotted track pattern as determined above should be consulted. The nozzles are always removed in pairs to ensure that the jet tool remains in balance. Plugs are placed within the empty adapter seats to maintain fluid pressure at the jets. Any pair of nozzles may be removed as long as adjacent jet tracks are not disturbed, as shown by the plot given above. Thus, in the example given, if nozzle $n_1$ and nozzle $n_2$ were removed, the track spacing between nozzle $n_5$ and nozzle $n_{15}$ and between nozzle $n_{16}$ and nozzle $n_6$ would be ¼ inch. This spacing ensures that each point on the liner remains covered at least once. However, if nozzles $n_{13}$ and $n_4$ were removed, for example, the spacing between the track given by nozzle $n_9$ and nozzle $n_8$ would be ⅜ inch, which is greater than ¼ inch and a gap would occur. In the field, it is often easiest to remove the pair of nozzles which are circumferentially spaced 180° from each other, for example, nozzles $n_1$ and $n_2$ or nozzles $n_{15}$ and $n_{16}$. These nozzles also are located at the end of the jet tool.

Referring to FIGS. 3 and 4, the attachment of the nozzles to the adapters 52, which are in turn mounted in the adapter seats 54, will now be described. Each adapter seat 54 has a threaded bore 68 which extends down into the interior of the jet tool 42 to the fluid channel 56. At the outer end of the threaded bore 68, a shoulder 64 is formed by an enlarged diameter counterbore. A groove 66 for receiving an O-ring 69 is disposed between the threaded bore 68 and the shoulder 64. The adapters 52 have a hexagonal head 70.

The adapter 52 also has a threaded bore 78 which communicates with the exterior. A counter bore 76 at the outer end of the threaded bore 78 forms a shoulder 79. The threaded bore 78 extends down through the length of the adapter 52 and is threaded with ¾ inch straight pipe thread in the preferred embodiment.

The adapter 52 is mounted within the adapter seat 54 by threading the body 74 into the threaded bore 68. The adapter 52 will screw into the adapter seat 54 until the adapter head 70 abuts the shoulder 64. An "O" ring 69 is placed around the groove 72. The "O" ring provides a seal between the adapter seat 52 and the adapter body 74.

Referring to FIG. 4, the nozzle $n_6$ will now be described. This description applies equally well to any of the nozzles $n_1$ through $n_{16}$. The nozzle $n_6$ has a head 80 which narrows to an externally threaded body 82. Located between the head 80 and the body 82 is an O-ring groove 84. The head 80 of the nozzle $n_6$ forms a shoulder which seats on shoulder 79. The body 82 is externally threaded with a ¾ inch straight pipe thread in the preferred embodiment. Extending through the middle of the nozzle $n_6$ is a passage 86 which is widest at the innermost end of the nozzle $n_6$ and then narrows to the orifice 62 which in the preferred embodiment is 0.03 inches in diameter.

In order to mount the nozzle $n_6$ within the adapter 52, the body 82 is screwed into the adapter bore 78. The threading continues until the nozzle head 80 abuts the shoulder 79 of the adapter. An "O" ring is placed around the groove 84 of the nozzle $n_6$. This "O" ring provides a seal between the body 82 of the nozzle $n_6$ and the adapter 52.

When water is supplied through the jet tool passage 56, it will be forced into the passage 86 and will eventually be expelled through the orifice 62 directed toward the well liner to be cleaned.

The nozzles $n_1$ through $n_6$, and the jet tool 42, are of a standard size. However, the adapters 52 come in a variety of sizes. The depth from the shoulder 79 to the shoulder 64 is an important dimension and is labeled "A" in FIG. 4. The dimension "A" importantly varies in each of the different adapter sizes. It should be understood that the value of the dimension "A" will determine how far the nozzles $n_1$ through $n_{16}$ protrude from the adapters 52. Thus, the larger the dimension "A", the more the nozzles will protrude from the adapters 52. As the size of the adapters 52 increases, the length of the adapter body 74 remains essentially the same. Thus, in all sizes of adapters, the adapter will be screwed into the jet adapter seat 54 the same distance. Thus, as the size of the adapters increases, the dimension "A" increases, and the distance the nozzles protrude from the adapters will accordingly increase.

The adapters 52 are therefore extremely important in determining the distance between the nozzle heads 80 and the well liner 18. This distance is defined as the standoff distance and is of critical importance in the cleaning operation. It has been found that a standoff distance of approximately 5–10 times the diameter of the jet orifices is required for efficient cleaning. If the standoff distance increases to much above 10 times the diameter of the jet orifice, the power of the jet spray against the liner will drop off markedly. In fact, the power decreases proportionally to the square of the standoff distance. Conversely, if the standoff distance falls below about 1½ times the diameter of the jet orifice, the jet stream is reduced to a laminar flow along the jet liner and no cleaning power results. A standoff distance of about 1½ to about 5 times the diameter of the jet orifice is acceptable, but dimensional tolerances provide problems of fitting the jet tool within the liner.

For any given liner size above 5½ inches in diameter, at least one adapter size is available to provide the required standoff distance of between about 5–10 times the diameter of the jet orifice.

In the old design, the standoff distance could only be regulated by providing jet tools of differing diameters. This caused serious problems in keeping adequate inventories and also provided transportation difficulties to on-site operations. As a result, only four sizes of jet tools were available. With this design, the required standoff distances were sometimes exceeded by as many as 10–15 diameters of the jet orifice. The Chevron patent disclosures also teach that minor adjustments to the standoff distance could be made by turning the nozzles in and out. However, as a practical matter, this could not be incorporated into applicant's old design due to fluid sealing problems which resulted.

The centralizers 38 and 48 also affect the standoff distance, as will be described below.

Use of the threadably mounted adapters 52 also is a distinct advantage over the old design in that weld failure problems which resulted from the welded extensions are eliminated.

Referring to FIGS. 2, 3 and 3a, the structure and function of the centralizers 38, 48 will now be described. The centralizer 38 has an inner tubular body 88. Four ribs 90 extend radially outward from the tubular body 88 at equally spaced intervals of about 90°. Each of the ribs 90 has the shape of a trapezoidal prism. The ribs 90 have a top side 92 which mounts a hardband dressing 94. The top side 92 angles inward toward the inner tubular body 88 by means of beveled sides 96 and 98.

The inner diameter of the inner tubular body 88 is slightly larger than the outer diameter of the mandrel 36. The centralizer is thus free to rotate about the mandrel. Thus, the rotation of the centralizer 38 is isolated from any rotation of the tubing string 24. The centralizer 38 has a pair of "O" rings 100 which are placed between the mandrel 36 and the tubular body 88. The "O" rings provide a grease seal for grease which is placed between the mandrel 36 and the centralizer 38.

The mandrel 36 is axially longer than the centralizer 38. The centralizer 38 is thus also free to move along the mandrel 36 axially. The axial movement of the centralizer 36 is confined by the collars 34 and 40 which are of larger outer diameter than the outer diameter of the mandrel 36. In the preferred embodiment, the dimension between the collars 34 and 40 is about two inches greater than the axial length of the centralizer to permit about two or more inches of axial relative movement.

The structure of the centralizer 48 is essentially identical to that of the centralizer 38. Thus, the centralizer 48 has an inner tubular body 102 and four equally spaced radially outwardly extending ribs 104. Each of the ribs has a top side 106 which mounts hardband dressings 108. The ribs 104 also have beveled sides 110 and 112. The centralizer 48 is free to move axially along the length of the mandrel 46. Grease sealing "O" rings 114 are placed between the mandrel 46 and the tubular body 102. The axial movement of the centralizer 48 is confined by the collar 44 and the bull plug 50.

The outer diameter of the centralizers 38, 48, as measured from the radial extension of the hardband dressing 94, 108, plays an important role in maintaining the required standoff distance. Thus, the centralizers 38, 48 are provided in various sizes depending upon the size of the liner. For any given liner, there is a centralizer size available which will provide the required standoff distance of 5–10 times the diameter of the jet orifice.

Utilization of the adapters and centralizers on the same bsaic tool permits easy changing of the carrier size on relatively short notice. This also permits a wider range of carrier sizes in inventory at a reduced cost because the jet tools and mandrels are standard and only the adapters and centralizers are needed to be changed.

Thus, the centralizers, along with the adapters, are instrumental in providing the required standoff distances. The centralizers 38, 48 also prevent the jet nozzles from contacting the metal walls of the liner, thereby eliminating closing by peening of the jet orifice. Moreover, the pair of centralizers ensures the concentric rotation of the jet carrier 32.

The old design provided a tri-blade pilot bit which, to some extent, regulated standoff distance. However, the bit was only used at the lowermost position on the jet carrier assembly. Thus, the tubing string could deviate from concentric rotation resulting in jet nozzle peening and also violations of the required standoff distance. The placement of centralizers above and below the jet tool eliminates these problems and, in addition, these centralizers are available in more sizes so that the standoff distances can be even more uniformly controlled.

The floating nature of the centralizers tends to reduce and, in many cases, eliminates any back-torque which can be caused because of contact between the centralizers and the well liner. In addition, the beveled ends 96, 98, and 110, 112 help prevent any catching of the jet tool assembly within the well liner. The fact that the centralizers 38, 48 are capable of axial movement, is also an important feature. If the centralizers should become jammed within the well liner, the tubing string 24 may be reciprocated up and down within the well bore. This produces a hammering or jarring action which tends to help free the jet tool assembly. This would not be possible if the centralizers were not free to move axially with respect to the tubing string.

Referring to FIGS. 3 and 3a, the collars 34, 40 and 44 are cylindrical structures which have central threaded bores. Thus, the tubing string 24 is threaded into the collar 34 as is one end of the mandrel 36. The other end of the mandrel 36 is threaded into the collar 40, which also receives the threaded end 58 of the jet tool 42. The lower end 60 is threaded into the collar 44 as is one end of the mandrel 46. Such connections will be well understood by those of ordinary skill in the art.

What is claimed:

1. A device for washing well liners comprising:
an elongate member having jet nozzles spaced along its length;
tubing connected to [each] *one* end of said member;
a centralizer located proximate to one end of said member, said centralizer being rigid and having a central bore for slidably engaging said tubing to permit substantial axial movement along said tubing; and
means to confine said axial movement of said centralizer, said axial movement being sufficient to permit reciprocation of said tubing with respect to said centralizer, said reciprocation providing a jarring action to help free said centralizer when jammed within said liner.

2. A method for washing well liners comprising:
providing an elongate member having a plurality of jet nozzles spaced along its length, said member being of a standard size;
providing a plurality of sizes of adapters for receiving said nozzles on said member;
determining the size of said well liner; and
selecting an adapter sized to provide a jet nozzle to liner standoff distance of about 5–10 times the diameter of the nozzle orifice.

3. The method of claim 2 further comprising:
providing a plurality of sizes of centralizers adapted to slidably engage tubing adjacent said member; and
selecting a centralizer sized to insure concentric rotation of the member and to prevent the jet nozzles from contacting the liner.

* * * * *

UNITED STATES PATENT AND TRADEMARK OFFICE

CERTIFICATE OF CORRECTION

PATENT NO. : Re. 31,495

DATED : January 17, 1984

INVENTOR(S) : Casper W. Zublin

It is certified that error appears in the above-identified patent and that said Letters Patent is hereby corrected as shown below:

On the front of the Reissue Patent, add DOWNHOLE SERVICES, INC., as assignee.

In column 6, line 2, delete "respctively" and insert in its place ---respectively--- .

In column 6, line 5, delete "piar" and insert in its place ---pair--- .

In column 2, line 2, delete the second occurrence of "fixed" and insert in its place ---affixed--- .

Signed and Sealed this

*Fifteenth* Day of *January 1985*

[SEAL]

*Attest:*

*Attesting Officer*

GERALD J. MOSSINGHOFF

*Commissioner of Patents and Trademarks*